United States Patent
Crichlow

(10) Patent No.: US 11,443,864 B2
(45) Date of Patent: Sep. 13, 2022

(54) MANAGING THE DISPOSAL OF HIGH-LEVEL NUCLEAR WASTE

(71) Applicant: Henry Crichlow, Norman, OK (US)

(72) Inventor: Henry Crichlow, Norman, OK (US)

( * ) Notice: Subject to any disclaimer, the term of this patent is extended or adjusted under 35 U.S.C. 154(b) by 337 days.

(21) Appl. No.: 16/904,517

(22) Filed: Jun. 17, 2020

(65) Prior Publication Data

US 2021/0027902 A1 Jan. 28, 2021

Related U.S. Application Data

(60) Provisional application No. 62/877,807, filed on Jul. 23, 2019.

(51) Int. Cl.
| | | |
|---|---|---|
| *G21F 9/34* | (2006.01) | |
| *G21F 9/30* | (2006.01) | |
| *G21F 5/14* | (2006.01) | |
| *G06Q 20/10* | (2012.01) | |

(52) U.S. Cl.
CPC ........... *G21F 9/34* (2013.01); *G21F 5/14* (2013.01); *G21F 9/30* (2013.01); *G06Q 20/10* (2013.01)

(58) Field of Classification Search
CPC .... G21F 9/34; G21F 5/14; G21F 9/30; G06Q 20/10
USPC ......................................................... 588/17
See application file for complete search history.

(56) References Cited

U.S. PATENT DOCUMENTS

| | | |
|---|---|---|
| 8,036,951 B2 | 10/2011 | Kraft |
| 8,046,238 B2 | 10/2011 | Solomon |
| 8,429,063 B2 | 4/2013 | Chehade |
| 9,230,242 B2 | 1/2016 | Zhang |

OTHER PUBLICATIONS

Center for Sustainable Systems, University of Michigan. 2018. "Nuclear Energy Factsheet." Pub. No. CSS11-15., Aug. 2018.
"Estimation of Global Inventories of Radioactive Waste and Other Radioactive Materials", Jun. 2007, IAEA-TECDOC-1591.
"US Nuclear Plant Owners and Operators", Jun. 2019. https://www/nei.org/resources/statistics/us-nuclear-plant-owners-and-operators6/2019.

*Primary Examiner* — Edward M Johnson
(74) *Attorney, Agent, or Firm* — Eric Kelly

(57) ABSTRACT

A method for managing disposal of high-level nuclear waste (HLW) may include: generating electrical power from nuclear fuel; producing HLW as a byproduct from generating the electrical power; encapsulating the HLW within waste-capsules, forming a deep geologic repository for disposing of the encapsulated HLW; and/or loading the HLW into lateral wellbore(s) of the deep geologic repository. The method may also include other steps such as, but not limited to: surface storage and transporting steps of the HLW; licensing steps; receiving payments; closing the deep geologic repository; monitoring, maintaining and/or providing security with respect to the deep geologic repository; and/or using the deep geologic repository for either temporary HLW disposal or permanent HLW disposal. At least some of the steps in the method may be carried by a nuclear power generating company and/or agent(s) thereof; such that the nuclear power generating company takes an active role in the disposal of HLW.

19 Claims, 6 Drawing Sheets

MANAGING THE DISPOSAL OF HIGH-LEVEL NUCLEAR WASTE

PRIORITY NOTICE

The present application claims priority under 35 U.S.C. § 119(e) to U.S. Provisional Patent Application Ser. No. 62/877,807 filed on Jul. 23, 2019, the disclosure of which is incorporated herein by reference in its entirety.

Cross Reference to Related Patent Applications

This patent application is related to previous patents by the same inventor related to the disposal of nuclear waste. These patents are: United States (U.S.) Pat. Nos. 5,850,614; 6,238,138; 8,933,289; and 10,427,191, the disclosures of which are all incorporated herein by reference in their entirety.

TECHNICAL FIELD OF THE INVENTION

The present invention relates in general to managing disposal of high-level nuclear waste and more specifically to nuclear power generation companies managing the disposal of the high-level nuclear waste.

COPYRIGHT AND TRADEMARK NOTICE

A portion of the disclosure of this patent application may contain material that is subject to copyright protection. The owner has no objection to the facsimile reproduction by anyone of the patent document or the patent disclosure, as it appears in the Patent and Trademark Office patent file or records, but otherwise reserves all copyrights whatsoever.

Certain marks referenced herein may be common law or registered trademarks of third parties affiliated or unaffiliated with the applicant or the assignee. Use of these marks is by way of example and should not be construed as descriptive or to limit the scope of this invention to material associated only with such marks.

BACKGROUND OF THE INVENTION

Expansion of the nuclear power generation industry around the world has produced a pernicious and deadly byproduct. This byproduct is a high-level nuclear waste (hereinafter, "HLW"). To life, HLW may be the most dangerous material on Earth, and HLW may remain hazardous for hundreds of thousands of years. Prior to work by the present inventor, there has not been a well-though-out means for disposal of this radioactive waste. Massive technological changes and improvements have been directed at efficient power generation systems by equipment building, and power generation companies; however, little or no effort has been expended by these companies to solve the problem of their hazardous and dangerous radioactive nuclear waste (HLW). This absence of properly dealing with the dangers of HLW has been reported by some as a major dereliction of duty by the nuclear power companies and their suppliers of the nuclear power generation technology. To date, and aside from work of the present inventor, there has been no firm methodology to provide for HLW disposal safely.

There are multifaceted issues that make the HLW disposal a complex and almost intractable problem. Stakeholders in the nuclear power generation processes may include the following: power companies (utilities); suppliers of power companies; governments (e.g., U.S. federal, state, regional, local, municipal, county, city, foreign, etc.); municipal groups; environmental groups; people (workers, residents, citizens, the public, indigenous peoples, etc.); international agreements; the press; combinations thereof; and/or the like. International law, agreements, and/or treaties may play a role in the handling and/or disposal of HLW. Each particular stakeholder may have its own needs and/or agenda; however, an over-riding issue is that the HLW is not going away and it shall remain deadly for up to about 500,000 years. Any Earth lifeform may be irrevocably harmed by exposure to HLW. A solution to the problems of handling and disposal of HLW, which have developed over the last 50 years and is growing, is needed.

Under existing U.S. law, the nuclear power generation companies have by statute depended on governmental agencies to facilitate the disposal of HLW. In the U.S. this disposal authority has been the purview of the Atomic Energy Commission (AEC), the Nuclear Regulatory Commission (NRC), and the U.S. Department of Energy (US-DoE). In 1982, the U.S. federal government agreed to take HLW starting by 1998. This transfer did not occur. Litigation began and has continued to date. Unfortunately, this has been the norm in HLW disposal. An objective of this patent application is to "go beyond this norm" to formulate a new and effective approach to managing the HLW disposal problems.

There is currently more than 80,000 Metric tons (MT) of HLW located at various sites around the U.S. and accumulating at a rate of approximately 2,500 MT per year in U.S.

In the U.S., HLW disposal at Yucca Mountain (Mt.) is the current law. HLW is contemplated to be disposed of or stored at Yucca Mt. However, no consensus on the suitability of Yucca Mt. exists. For example, currently, more than 300 technical and legal contentions exist which the NRC must address to license Yucca Mt. The NRC has estimated it will cost at least $330 million and up to five years just to complete the licensing process. No estimate has even been made on the actual operations or costs to maintain the Yucca Mt. facility.

The nuclear power utility companies have collected on a per KwHr (kilowatt hour) basis, billions of U.S. dollars in fees from electricity end-users, which has been escrowed to pay for the ultimate HLW disposal. In the U.S., the set-aside fund may be about $40 billion (U.S. dollars) (e.g., as of 2018).

There is currently a wide array of means for disposal of this HLW. A most promising methodology is the use of deep geological repository systems. To date, no deep repository has been implemented anywhere around the world.

There is a concerted effort against any nuclear waste disposal system being implemented in most states in the U.S. The currently selected site is at Yucca Mt. in Nevada, this site though initiated in 1978, has been unable to be developed because of its problems, including social and legal roadblocks at every level. Yucca Mt. has geologic deficiencies, cost overruns, legal complications at the local, state, and federal levels and by all present forecasts, it is possible that this location will never be used as a HLW disposal site. This feeling is currently held by many of the state congressional and senate representatives. With this impasse, it is concluded that after many decades, that the Yucca Mt. solution will not become a reality for HLW disposal.

A new, more viable approach to the management of HLW disposal is needed. Without a safe and effective HLW disposal system, nuclear power generation may cease to exist across the U.S. and/or the world. There is a critical need for a novel, viable, and effective management solution to the HLW disposal problem. This new solution is a primary objective of the current application.

There is a need in the art for methods for managing the disposal of HLW.

It is to these ends that the present invention has been developed.

BRIEF SUMMARY OF THE INVENTION

To minimize the limitations in the prior art, and to minimize other limitations that will be apparent upon reading and understanding the present specification, embodiments of the present invention may describe methods for managing disposal of high-level nuclear waste (HLW), that may comprise such steps as: generating electrical power from nuclear fuel; producing HLW as a byproduct from generating the electrical power; encapsulating the HLW within waste-capsules, forming a deep geologic repository for disposing of the encapsulated HLW; and/or loading the HLW into lateral wellbore(s) of the deep geologic repository. The method may also include other steps such as, but not limited to: surface storage of the HLW; transporting steps of the HLW; licensing steps (e.g., receiving governmental approval of the deep geologic repository for use in HLW disposal); receiving payments (e.g., from the government for HLW disposal); closing the deep geologic repository; monitoring, maintaining and/or providing security with respect to the deep geologic repository; and/or using the deep geologic repository for either temporary HLW disposal or permanent HLW disposal. At least some of the steps in the method may be carried by at least one nuclear power generating company and/or agent(s) thereof; such that the nuclear power generating company takes an active role in the disposal of HLW.

Some embodiments of the present invention may be directed to a method (or methods) of managing the disposal of high-level nuclear waste (e.g., HLW and/or SNF) byproducts. In some embodiments, such method(s) may be a direct disposal method (DDM™) in which the power generation companies direct and/or manage the high-level nuclear waste disposal operations.

In some embodiments, a management system may teach that the power generating utilities initiate the HLW disposal process, wherein the HLW may be disposed of by the utilities, using specific existing technologies directly related to the disposal of waste in deep geologic formations and those technologies that are accepted by the regulatory (government) authorities.

The power generating industry is contemplated to be the primary driver or developer in initiating the processes needed to dispose of HLW safely. In some embodiments, at least one power generation company shall implement steps and/or operations that are needed to procure, design, license, and/or implement those assets and operations needed to address the HLW disposal process as shown and described herein.

In some embodiments, at least one power generation company may contract with a nuclear waste disposal company. In some embodiments, this nuclear waste disposal company may contract with an oil well services drilling type of service company capable of drilling the necessary wellbores to construct the underground deep nuclear waste repository. In some embodiments, the at least one power generation company and the nuclear waste disposal company may be third parties with respect to each other. In some embodiments, the nuclear waste disposal company and the oil well services drilling type of service company may be third parties with respect to each other.

In some embodiments, the nuclear waste disposal company and/or the oil well services drilling type of service company may be owned and/or may be subsidiaries (or the like) of the at least one power generation company; i.e., the at least one power generation company may be vertically integrated with respect to the nuclear waste disposal company and/or the oil well services drilling type of service company.

In some embodiments, the at least one power generating company may contract (directly or indirectly) with other service providers; such as, but not limited to, for encapsulating the HLW waste within capsules (canisters) and/or for preparing the capsules (with the HLW) for sequestration into the given deep underground reservoir formations.

In some embodiments, the at least one power generation company may contract (directly or indirectly) with and utilize various means for transporting the encapsulated HLW from surface storage location(s) to various disposal sites (that in communication with at least one deep underground reservoir formations) which have been preselected and prepared for the final disposal of the HLW.

In some embodiments, the at least one power generation company (or its agents or associated companies) may be paid (directly or indirectly) by the Government or a government-related agency for services in disposing of the HLW.

In some embodiments, the Government or a government agency (e.g., U.S. federal government) shall become the ultimate title holder (or owner) of the HLW (e.g., to satisfy/comply with current U.S. law). Title (ownership) to the HLW may be vested in the Government by the at least on power generation company. Thereupon, maintenance and security obligations, may belong to the Government and its associated agencies in perpetuity.

It is an objective of the present invention to provide a method of managing the disposal of HLW such that a nuclear power generating company may take an active role in the disposal of HLW.

It is another objective of the present invention such a method that is safer for the environment as compared to existing in use HLW disposal practices.

It is yet another objective of the present invention such a method that is more economically feasible as compared to existing in use HLW disposal practices.

It is another objective of the present invention to provide such a method that provides utilities with a sense of certainty and a predetermined mechanism that allows them to plan operations without the continuing confrontational legal and financial liability problems regarding the surface storage of HLW, that was never intended to be long-term.

These and other advantages and features of the present invention are described herein with specificity so as to make the present invention understandable to one of ordinary skill in the art, both with respect to how to practice the present invention and how to make the present invention.

BRIEF DESCRIPTION OF THE SEVERAL VIEWS OF THE DRAWINGS

Elements in the figures have not necessarily been drawn to scale in order to enhance their clarity and improve understanding of these various elements and embodiments of the invention. Furthermore, elements that are known to be common and well understood to those in the industry are not depicted in order to provide a clear view of the various embodiments of the invention.

Figure 1:
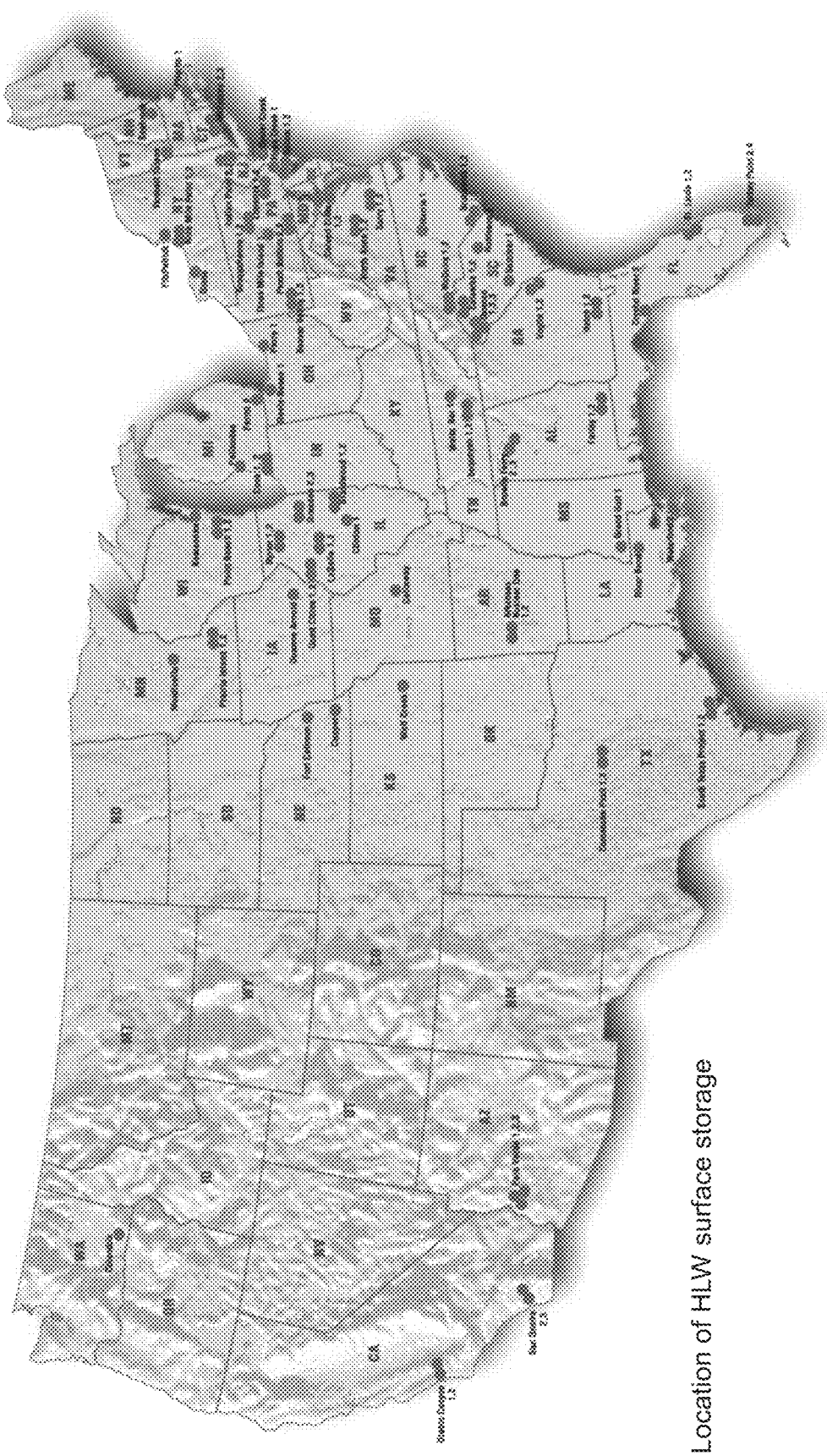
FIG. 1 shows a continental U.S. map of locations where the spent nuclear fuel (HLW) is currently stored in surface facilities.

REFERENCE NUMERICAL SCHEDULE 1 deep underground lateral wellbore 1
2 vertical wellbore 2
3 waste-capsule 3
3a protective sheath 3a
4 deep geologic formation rock 4 (or deep geologic repository 4)
5 nuclear power generation facility 5
6 drilling rig 6
7 surface storage (of HLW) 7
8 spent nuclear waste fuel (HLW) 8
400 prior art method managing HLW 400
401 step of generating electric power (from nuclear fuel) 401
402 step of producing HLW as SNF 402
403 step of collecting and temporary storage of SNF by power companies 403
404 step of temporary storing of SNF assemblies in cooling ponds (pools) 404
405 step of storing SNF assemblies in casks on surface 405
406 step of fee collection for each KwHr sold by power companies 406
407 promissory step by U.S. government to take care of HLW 407
408 step showing year 2019 status of HLW disposal in U.S. 408
409 step of current accumulation and non-disposal of HLW on surface 409
500 method of managing disposal of HLW 500
501 step of power generating utility contracting with nuclear waste disposal companies 501
503 step of encapsulating HLW 503
505 step of licensing and/or implementing transport of HLW capsules 505
507 step of loading and sequestering HLW capsules into geologic repository 507
509 step of transferring title and/or ownership of HLW to Government Agency 509
511 step of the Government paying the utility 511
513 step of closing (sealing) the geologic repository 513
515 step of maintaining and/or securing geologic repository 515
517 step of using geologic repository as temporary or permanent HLW disposal facility 517
519 step of filling the geologic repository with HLW material (to capacity) 519
521 step of designing, licensing, and/or implementing wellbore in geologic repository 521
523 step of licensing geologic repository 523

DETAILED DESCRIPTION OF THE INVENTION

A number of terms (with or without reference numeral indicators) are used in connection with describing various embodiments of the present invention. Such terms may be used to illustrate but not necessarily limit the possible meaning of such terms. However, such terms (e.g., components, items, elements, parts, structural names, systems, methods, processes, steps, combinations thereof, and/or the like) used herein, often associated with a given reference numeral, may be intended to imply and/or suggest a structure and/or function by the name of the given term. For example, and without limiting the scope of the present invention, as used herein "high-level waste" that may be radioactive and a byproduct of electric power generation from nuclear fuel may be designated as "HLW"; "spent nuclear fuel" may be designated "SNF"; an "underground repository" or "geologic repository" may be a particular construction within a particular geologic rock/formation, located deep beneath the Earth's surface, implemented by drilling at least one wellbore from the Earth's surface and into the given particular geologic rock/formation, to then facilitate insertion and sequestration (i.e., disposal) of HLW within that given particular geologic rock/formation; "capsule" and/or "canister" may be considered similar elements (i.e., particular types of containers) for containing the nuclear waste (HLW).

Further, in this patent application, such terms as "radioactive material," "radioactive waste," "nuclear material," "nuclear waste," "spent fuel assemblies," "SNF," "high-level nuclear waste," and/or "HLW" may be used interchangeably herein.

Also, in this patent application, such terms as "matrix rock," "host rock," "formation," "geological zone," "deep underground reservoir formations" and/or "deep geologic formation rock" may be used interchangeably; and may refer to a particular and/or predetermined rock structure within a deep geological (rock) formation that may be hosting (housing) the nuclear waste materials (HLW) within wellbores drilled into that given deep geological (rock) formation. Also, with respect to reference numeral "4" this reference numeral may refer to "deep geologic formation rock 4" or to "deep geologic repository 4." Deep geologic formation rock 4 may refer to the geologic rock/formation that a given deep geologic repository 4 may be located within. A given deep geologic repository 4 may comprise at least one lateral wellbore located within deep geologic formation rock 4.

Additionally, in this patent application, such terms as "well" and "wellbore" may be used interchangeably and may refer to (cylindrical) drilled out elements implemented in design and/or installation processes of some embodiments of the present invention.

Further still, in this patent application, such terms as "single well" or "common well" may refer to a wellbore that may be shared.

Also, in this patent application, such terms as "lateral" and/or "horizontal" wellbores may refer to substantially (mostly or nearly) horizontally drilled wellbore from a primary vertical or secondary type wellbore system. The secondary wellbore may itself be a lateral or horizontal wellbore. Lateral and/or horizontal in this context may be substantially orthogonal with respect to a local gravitational vector of the Earth. Lateral and/or horizontal in this context may be substantially parallel with respect to the above Earth's surface. Vertical in this context may be substantially parallel with respect to a local gravitational vector of the Earth. Vertical in this context may be substantially orthogonal with respect to the above Earth's surface.

Furthermore, in this patent application, such terms as "utility," "utility company," "nuclear power generating utility," "power company," "power generation company," "power generator," "generator," and/or the like, may be used interchangeably and may refer to either a single utility or to a group of utility companies operating singly or together to generate electricity from nuclear fuel and which will generate HLW as a byproduct of such electricity generation. Additionally, in some embodiments, such terms as "utility," "utility company," "nuclear power generating utility," "power company," "power generation company," "power generator," "generator," and/or the like, may also refer to associated and/or subsidiary companies of the given nuclear power generating utility, such as, but not limited to, nuclear waste disposal companies.

Also, in this patent application, nuclear waste disposal companies may include oil field companies or the like (e.g., for drilling and forming wellbores, loading waste-capsules into wellbores, for sealing wellbores, etc.); transport companies (e.g., for transporting HLW and/or waste-capsules); waste-capsule formation, preparation, and/or encapsulating companies (e.g., for loading HLW into formed and prepared waste-capsules); storage pool/pond operators; storage cask operators; combinations thereof, and/or the like. Nuclear waste disposal companies may or may not be owned by nuclear power generating utilities.

In the following discussion that addresses a number of embodiments and applications of the present invention, reference is made to the accompanying drawings that form a part thereof, where depictions are made, by way of illustration, of specific embodiments in which the invention may be practiced. It is to be understood that other embodiments may be utilized and changes may be made without departing from the scope of the invention. Note, the images and/or contents of the accompanying drawings may not be drawn/rendered to scale.

FIG. 1 may illustrate a map of the continental United States (U.S.) showing at least some general locations of where high-level nuclear waste (HLW) (e.g., as SNF) may be stored on the surface or at nuclear power generating facilities, wherein such surface storage locations are supposed to be for temporary and not permanent storage of the HLW.

This FIG. 1 map may also indicate possible surface site locations, below which, the HLW may potentially be stored in deep geological repositories, if the subsurface geology at the given surface site is adequate and/or can meet stringent requirements of long-term HLW disposal regulations (laws).

Figure 2A:
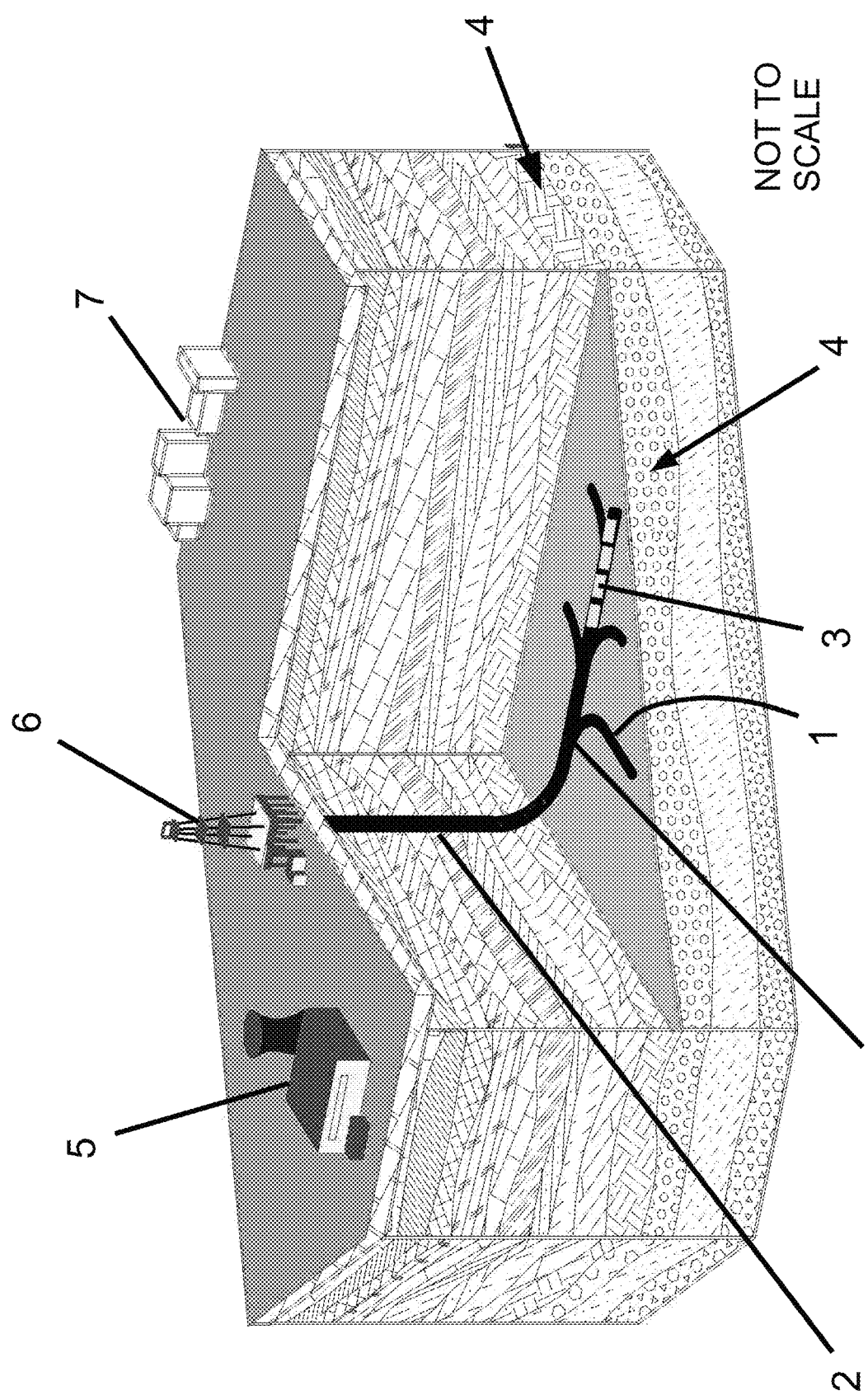
FIG. 2A illustrates a schematic, with partial cutaway, of a deep underground geologic repository system for nuclear waste (HLW).

FIG. 2A illustrates a schematic, with partial cutaway, of a deep underground geologic repository system for nuclear waste (HLW). FIG. 2A may illustrate an inclusive overview of a nuclear waste disposal system. In some embodiments, the nuclear waste disposal system may comprise at least one vertical wellbore 2, at least one lateral/horizontal wellbore 1 that is operatively connected to the at least one vertical wellbore 2. In some embodiments, the nuclear waste disposal system may further comprise at least one waste-capsule 3. In some embodiments, the at least one waste-capsule 3 may be received (inserted) into the at least one vertical wellbore 2 and/or received (inserted) into the at least one lateral/horizontal wellbore 1. In some embodiments, the at least one waste-capsule 3 may contain (house) HLW (and/or SNF). In some embodiments, the nuclear waste disposal system may further comprise drilling rig 6. In some embodiments, the nuclear waste disposal system may further comprise nuclear power plant 5 and/or surface storage 7. In some embodiments, the surface drilling rig 6 may be an apparatus that drills the at least one vertical wellbore 2, the at least one primary lateral/horizontal wellbore 1, and/or a secondary lateral wellbore 1; into which the waste-capsule(s) 3 (with the HLW) may be disposed of in deep-geological-formation 4. In some embodiments, the secondary lateral wellbore(s) 1 may be stem from (branch off from) the at least one primary lateral/horizontal wellbore 1.

In some embodiments, the deep-geological-formation 4 may be located substantially from about 5,000 feet to about 30,000 feet below a surface, plus or minus 1,000 feet, below the Earth's surface (i.e., below drilling rig 6). In some embodiments, deep-geological-formation 4 may have geologic properties that make storing nuclear materials relatively safe. For example, and without limiting the scope of the present invention, in some embodiments, deep-geological-formation 4 may have one or more of the following geologic properties: structural closure, stratigraphically varied, low porosity, low permeability, low water saturation, reasonable clay content, sufficient isolation from water sources, sufficient isolation from the biosphere, combinations thereof, and/or the like.

For example, and without limiting the scope of the present invention, in some embodiments, primary lateral wellbore 1 may be located a predetermined depth of at least 10,000 feet below the surface (e.g., below the Earth's surface and/or below drilling rig 6), plus or minus 1,000 feet. In some embodiments, waste-capsule 3 may store (e.g., contain) HLW (high-level solid waste) and/or SNF (spent nuclear fuel). In some embodiments, associated usually with the nuclear waste disposal system shown in FIG. 2A, but normally at distant remote locations with respect to drilling rig 6, may be nuclear power plant 5; and/or surface-storage-locations 7 for nuclear waste (e.g., HLW and/or SNF) storage. In some embodiments, drilling-rig 6 may be a typical drilling rig as used in the oil-well drilling industry but with several updated modifications and features to allow safe handling of the radioactive waste (such as, HLW and/or SNF).

Figure 2B:
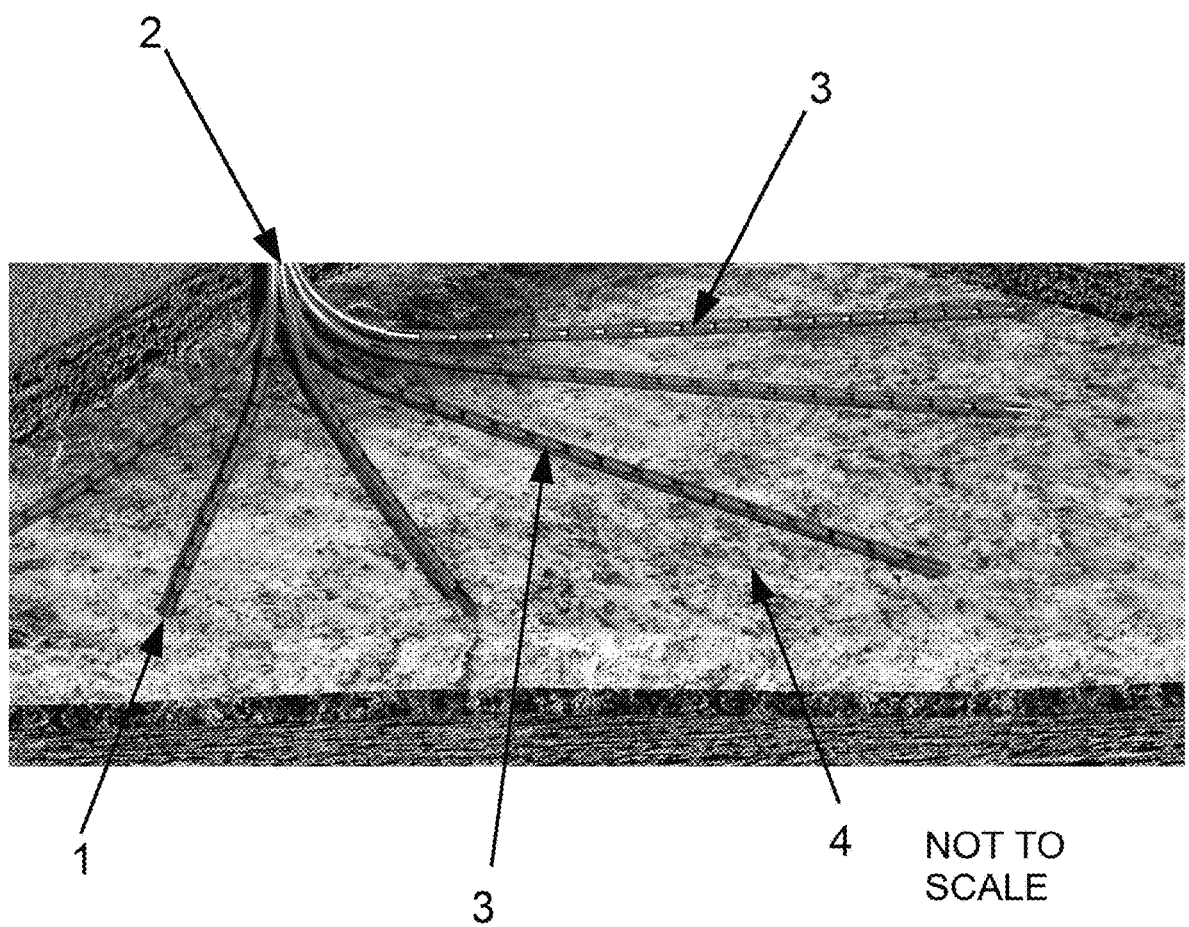
FIG. 2B illustrates a schematic closeup of a section of the deep underground geologic repository for nuclear waste (HLW) with waste capsules in multiple lateral wellbores of the repository.

FIG. 2B illustrates a schematic closeup of a section of the deep underground geologic repository for nuclear waste (HLW) with waste capsules in multiple lateral wellbores of the repository. FIG. 2B may show at least portions of a nuclear waste disposal system. FIG. 2B may show at least portions of the nuclear waste disposal system shown in FIG. 2A. FIG. 2B may illustrate a schematic view of several lateral wellbores 1 disposed from an initial vertical wellbore 2. These lateral or horizontal wellbores 1 may radiate from the initial vertical wellbore 2 and extended laterally (horizontally) in the repository formation 4 for between 1,000 feet and more than 20,000 feet in extent, plus or minus 500 feet. Inside these lateral wellbores 1 may the sequestered the waste-capsules 3, which may contain (house) the HLW (the contained HLW may or may not be in SNF form). In some embodiments, these waste-capsules 3 may loaded into the inside the innermost bore of the wellbores 1 and may be at least partially protected as shown in FIG. 3 by at least one concentric cylindrical structural/element, such as, but not limited to, at least one wellbore casings (e.g., of steel), at least one (cement) protective sheath 3a, the formation rock 4 itself, combinations thereof, and/or the like.

Figure 3:
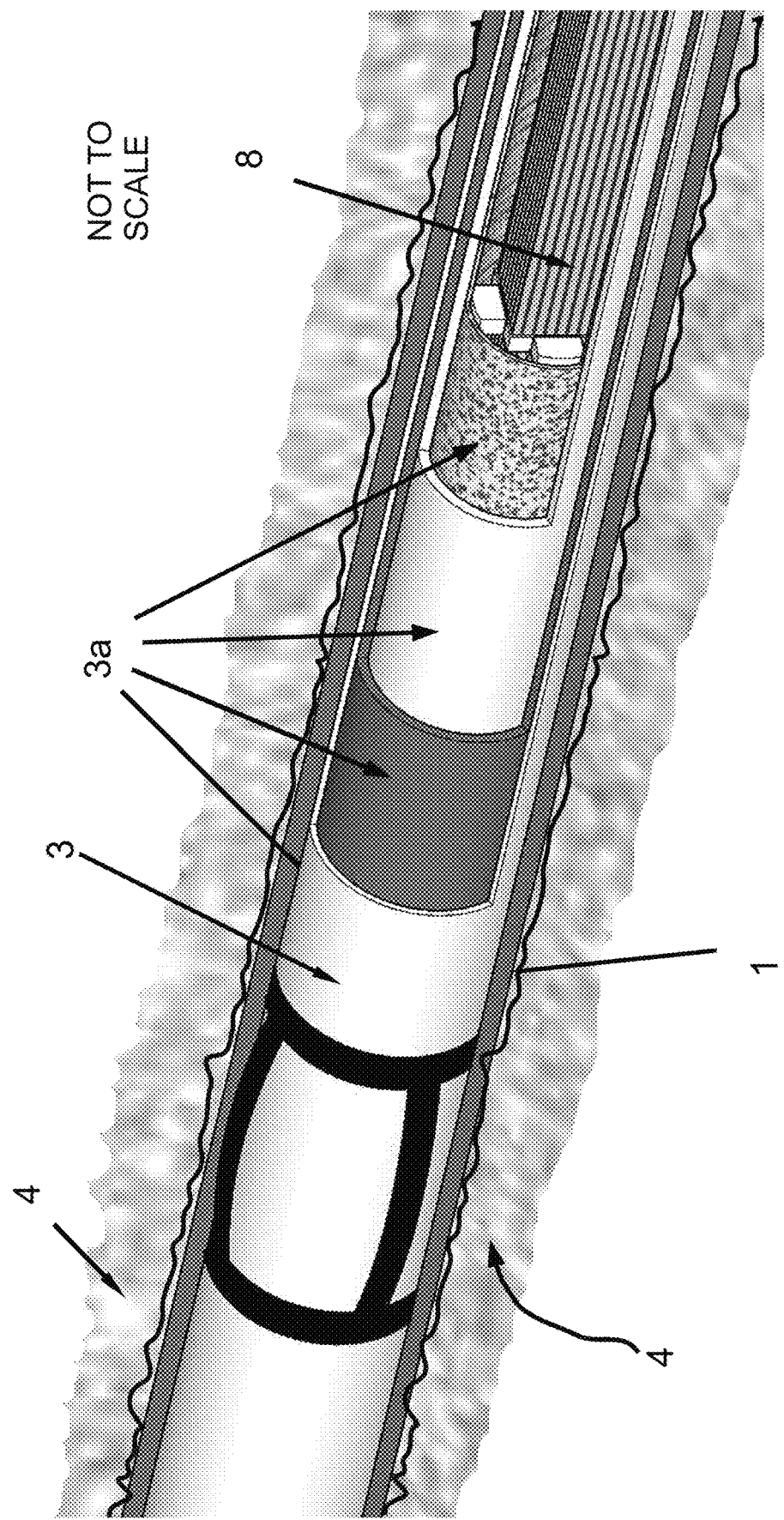
FIG. 3 illustrates a portion of a nuclear waste-capsule (with HLW inside) and its protective materials sheaths sequestered in a lateral (horizontal) wellbore within a deep underground nuclear waste repository.

FIG. 3 may illustrate a portion of a waste-capsule 3 which is sequestered in a lateral wellbore 1 drilled into the formation rock 4. Note, for the given waste-capsule 3 to reach this location within the given lateral wellbore 1, that given waste-capsule 3 must have first passed through the vertical wellbore 2. In some embodiments, the given waste-capsule 3 may comprise (contain/house) up to a predetermined amount (e.g., by volume, weight, and/or shape) of HLW 8. In some embodiments, the HLW 8 may be in the form of SNF or portion thereof, or in some other predetermined form. In some embodiments, the given waste-capsule 3 may be designed and constructed to maximize longevity of protection afforded to HLW 8 which may be positioned at an inner-most core location inside the concentric structures that may make up this given waste-capsule 3. In some embodiments, a given waste-capsule 3 may comprise at least one concentric and/or cylindrical protective sheath 3a. In some embodiments, the at least one concentric and/or cylindrical protective sheath 3a may be cylindrical and/or concentric structural members substantially made of steel and/or cement. Note, such protective sheaths 3a illustrated in FIG. 3 may be disclosed and discussed in the following U.S. utility patents and in the following U.S. utility patent applications, by the same inventor: U.S. Pat. Nos. 5,850,614, 6,238,138, 8,933,289, 10,427,191, U.S. utility patent application Ser. No. 15/936,245, U.S. utility patent application Ser. No. 16/709,701, and U.S. utility patent application Ser. No. 16/191,390; all of which are incorporated by reference herein.

Figure 4:
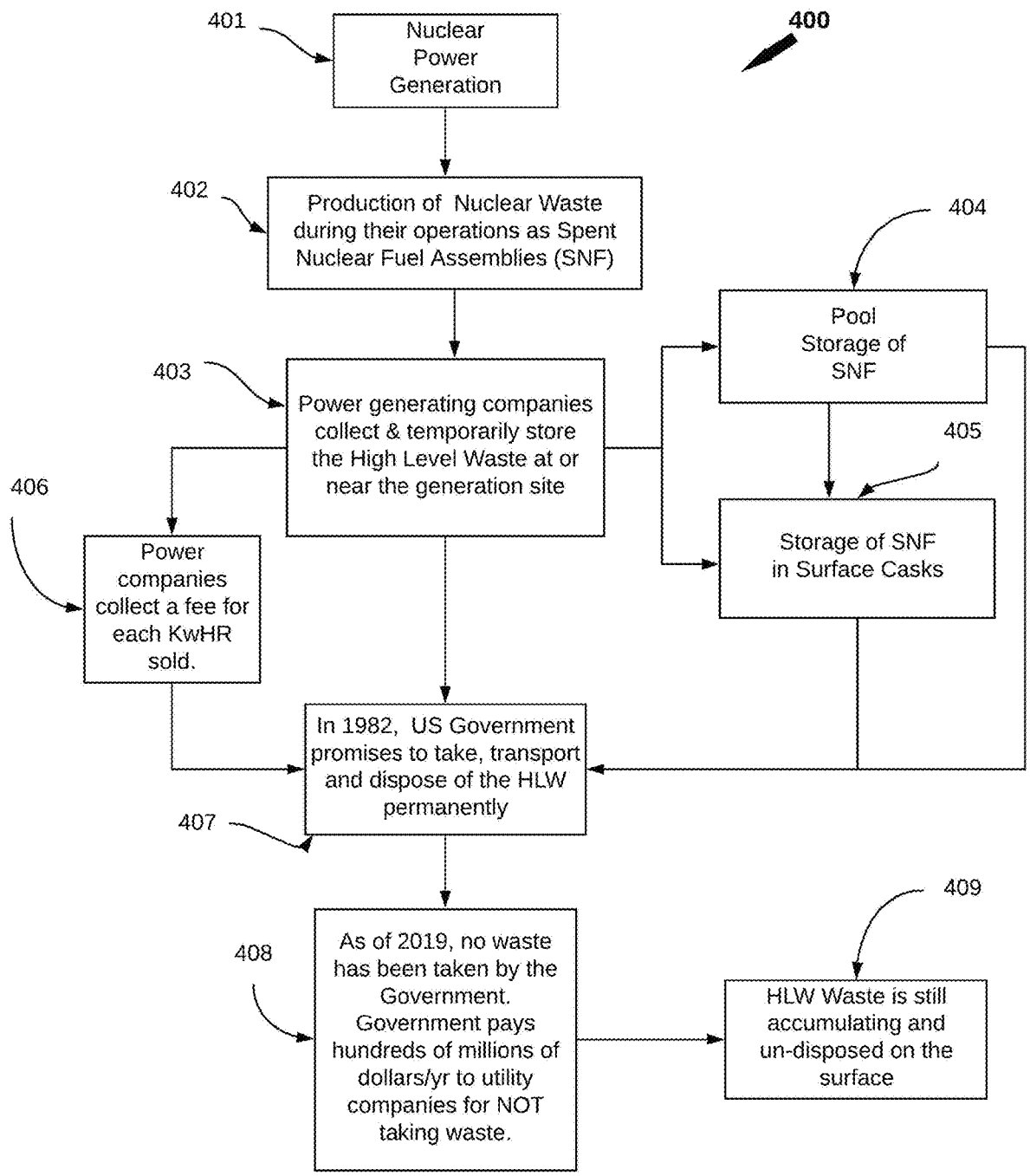
FIG. 4 shows a flowchart illustrating the currently existing prior art processes for HLW disposal that exist in practice.

FIG. 4 shows a flowchart illustrating the currently existing prior art process (method) for HLW disposal in the U.S., that exist in practice; and which have resulted in long-term storage of HLW (SNF) in surface locations (e.g., in pools/ pons and/or in casks) originally designed to be only for temporary storage. This in practice method is designated as method 400 herein. Method 400 may include steps of: 401, 402, 403, 404, 405, 406, 407, 408, and 409.

Continuing discussing FIG. 4, in method 400, step 401 may be a step of a given nuclear power plant 5 generating electricity from nuclear fuel. Step 401 may progress into step 402.

Continuing discussing FIG. 4, in method 400, step 402 may be a step of generating HLW as a byproduct of nuclear power plant 5 operations in step 401. Step 402 may be the process of generation where the spent fuel assemblies or rods (SNF) are produced as a result of the nuclear power cycle. Typically, such HLW generated as a byproduct of nuclear power plant 5 operations in step 401 is in the form of SNF. These HLW (SNF) materials are radioactive and extremely long-lived dangerous byproducts which should be removed from the ecosphere. Step 402 may progress into step 403.

Continuing discussing FIG. 4, in method 400, step 403 may be a step of the nuclear power plant 5 collecting and temporarily storing the HLW (SNF) (at or near the electric power generation site). In step 403, the utility company 5 has the additional task of collecting and storing the radioactive waste material (HLW/SNF) on the surface. Step 403 may progress into step 404 and/or step 405. Step 403 may also progress into step 406 and step 407.

Continuing discussing FIG. 4, in method 400, step 404 may be a step of storing HLW (SNF) from step 402/401 within pools and/or ponds on or at the Earth's surface (see e.g., surface storage location 7 in FIG. 2A). In step 404, the spent fuel assemblies (SNF/HLW) are stored locally in cooling ponds at the power plant location 5. In the cooling ponds the SNF (HLW) are able to reduce their heat output rate to a more manageable level such that these SNF assemblies can then be moved to dry cask surface storage systems (i.e., step 405). In step 404, the utility 5 may be compelled to store the HLW (SNF) initially in cooling ponds/pools at the power plant location 5, and years later, move these cooled HLW (SNF) elements to onsite or remote dry cask storage locations, albeit still on the surface as shown in step 405 of FIG. 4. Step 404 may progress into step 405 or into step 407.

Continuing discussing FIG. 4, in method 400, step 405 may be a step of storing HLW (SNF) from step 402/401 within casks on or at the Earth's surface (see e.g., surface storage location 7 in FIG. 2A). Step 405 may progress into step 407.

Continuing discussing FIG. 4, in method 400, step 406 may be a step of the nuclear power plant 5 collecting a monetary fee from its customers for each KwHr (kilowatt hour) sold, wherein such produced electricity was from a nuclear power plant 5. In step 406, by U.S. law, the utility 5 shall collect a fee for each KwHr of power sold to its customers (including the public). This fee is collected and supposed to be maintained in a fund to be used for the disposal of the produced HLW. As of the year 2019, this fund is nearing $40 billion (U.S. dollars). Step 406 may progress into step 407.

Continuing discussing FIG. 4, in method 400, step 407, with respect to the U.S., may be a step of the U.S. federal government having a legal obligation to take ownership (title), possession, control, and/or authority of the HLW (SNF) from step 401/402, and then transport and permanently dispose of that HLW (SNF). Step 407 illustrates the fact that the U.S. federal government had promised in the year 1982 to take possession of and safely dispose of all HLW permanently. Step 407 may progress into step 408.

Continuing discussing FIG. 4, in method 400, step 408, may be a step showing the status of HLW (SNF) disposal in U.S. as of the year 2019. As of 2019, the U.S. federal government has not met its obligations noted in step 407. As of 2019, the U.S. federal government has not taken title nor acquired any of the HLW (SNF) that has been generated from step 401/402. Instead, the U.S. federal government pays millions of dollars annually to keep the HLW (SNF) stored on the surface, which is ultimately a poor location for long term disposal of HLW (SNF). Step 408 may progress into step 409.

Continuing discussing FIG. 4, in method 400, step 409, may be a step of current accumulation and essentially non-disposal of HLW (SNF) on/at the Earth's surface. Step 409 is essentially extending steps 404 and/or 405, forcing what was intended to be temporary (short term) surface storage of HLW (SNF) into long term storage, with accumulating environmental and/or contamination risks of such ongoing continued practices. In step 409, the HLW is still accumulating across the country (e.g., the U.S.; see e.g., FIG. 1 and its above discussion). As noted above, there is no consensus that the so-called "preferred" Yucca Mt. site under existing U.S. law, will ever be, or could be safely, used for HLW (SNF) disposal. This lack of consensus is a major drawback and stumbling block in the development of the existing management technology and methods for HLW disposal.

Embodiments of the present invention are directed at correcting and/or solving the problems created by method 400 of FIG. 4.

Figure 5:
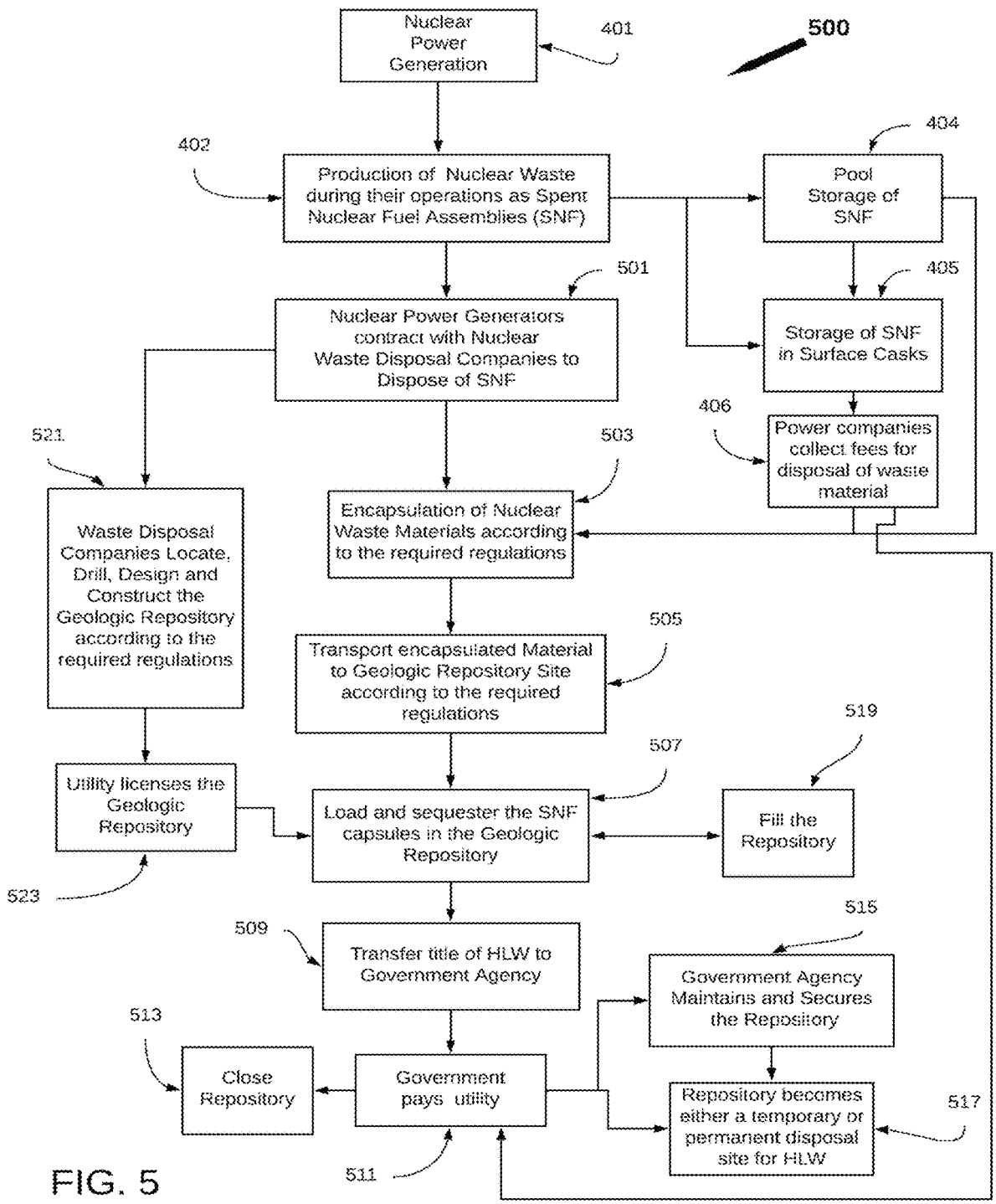
FIG. 5 shows a flowchart of an inventive process (method) for managing the disposal of HLW.

FIG. 5 may depict a flowchart. FIG. 5 may depict various steps of method 500. In some embodiments, method 500 may be a method for handling nuclear waste. In some embodiments, method 500 may a method of managing disposal of HLW. In some embodiments, method 500 may be a method for preparation of HLW 8, for subsequent subterranean storage of (prepared) HLW 8 in deep-geological-formations 4, according to one or more embodiments of the present invention. In some embodiments, method 500 may be a method for encapsulation of HLW 8 (e.g., encapsulating within waste-capsules 3) according to the one or more embodiments of the invention. In some embodiments, method 500 may be a method for transportation of the encapsulated HLW 8 to the disposal sites (e.g., location of drilling rig(s) 6 and/or surface location(s) of vertical wellbore(s) 2) according to one or more embodiments of the invention. In some embodiments, method 500 may be a method of loading and sequestering the waste-capsules 3 (with HLW 8) in the geologic repository 4 and filling, closing, and/or sealing the geologic repository 4 according to the one or more embodiments of the invention.

Continuing discussing FIG. 5, in some embodiments, method 500 may be a method of transferring title (ownership) of the HLW from the utility 5 to the Government (e.g., to the U.S. federal government). In some embodiments, method 500 may be a method of maintaining and securing the waste geologic repository 4 (with the HLW) by the Government. In some embodiments, method 500 may be a method of the Government paying for the services provided by the utility 5. In some embodiments, method 500 may be a method of maintaining the waste geologic repository 4 (with the HLW) as a temporary or as a permanent waste facility.

Continuing discussing FIG. 5, in some embodiments, method 500 may comprise one or more of the following steps: 401, 402, 404, 405, 501, 503, 505, 507, 509, 511, 513, 515, 517, 519, 521, 523, combinations thereof, and/or the like. In some embodiments, method 500 may progress in its steps out of numerical order with respect to the steps' reference numerals.

Continuing discussing FIG. 5, in some embodiments, steps 401, 402, 404, and 405 may be substantially similar to those same numbered steps in method 400, except in method 500: (a) step 402 may progress into step 501; (b) step 402 may progress into steps 404 and/or step 405; (c) step 404 may progress into step 503; and/or (d) step 405 may progress into step 503. In method 500, step 401 may still progress into step 402. In method 500, step 404 may still progress into step 405.

Continuing discussing FIG. 5, in some embodiments, step 501 may be a step of the nuclear power generating utility 5 (or their associate companies) contracting with nuclear waste disposal companies to carry out and/or implement at least on of the remaining steps of method 500. In some embodiments, the nuclear waste disposal companies may implement one or more systems as shown in FIG. 2A, FIG. 2B, and/or FIG. 3. In some embodiments, this may allow the nuclear power companies to be the primary driver in disposing of the HLW. This step 501 is a novel mechanism taught by this application, which heretofore has not been initiated, explored or implemented by the nuclear power industry. In the U.S., the nuclear power industry has always depended on Government to get rid of its HLW. The nuclear power industry had no disposal plan in place, contingency or otherwise meaningful to deal with the HLW it produced. The nuclear power industry had always expected to have the Government take title and dispose of the HLW since the nuclear power industry had been collecting billions of dollars for this specific disposal process and purpose. The combination of this new process in which the utility 5 "takes charge" along with existing technologies allows a novel, useful, and effective approach to the management of the disposal of HLW materials. In some embodiments, step 501 may progress into step 503 and/or into step 521.

In some embodiments, as an alternative to step 501 be a contracting step, instead in step 501, the nuclear power generating utility 5 may form one or more associated companies and/or subsidiaries for handling at least one remaining step in method 500, i.e., the nuclear power generating utility 5 may form one or more nuclear waste disposal companies for handling at least one remaining step in method 500. That is, in some embodiments, in step 501, the nuclear power generating utility 5 may become a vertically integrated company with one or more subsidiary/associated nuclear waste disposal companies.

In some embodiments, the nuclear waste disposal companies of method 500 and/or FIG. 5 may be under the control of the nuclear power generating utility 5, either by virtue of contract and/or by virtue of ownership (e.g., by a subsidiary relationship or the like).

Continuing discussing FIG. 5, in some embodiments, step 503 may be a step of encapsulating HLW. In some embodiments, at step 503, the nuclear waste disposal companies (and/or the nuclear power generating utility 5) may prepare and encapsulate the HLW, within waste-capsule(s) 3, for eventual disposal in the deep geologic repository 4, within lateral wellbore(s) 1. The encapsulation processes may require the nuclear waste disposal companies (and/or the nuclear power generating utility 5) to prepare the waste-capsules 3 according to governmental regulations and/or laws for safety and environmental purposes in disposing of the HLW. In some embodiments, step 503 may progress into step 505.

Continuing discussing FIG. 5, in some embodiments, step 505 may be a step of licensing and/or implementing transport of waste-capsules 3 (containing HLW). In some embodiments, at step 505, the nuclear generator companies or their associate companies (and/or the nuclear waste disposal companies) may transport the encapsulated HLW waste-capsules 3 to the surface wellsite of the geologic repository 4. To ensure safety and security of this dangerous encapsulated HLW material, this transportation process may be done under the strict regulatory supervision of applicable governmental agencies. In some embodiments, step 505 may progress into step 507.

Continuing discussing FIG. 5, in some embodiments, step 507 may be a step of loading and sequestering HLW (in waste-capsules 3 or in other predetermined forms) within lateral wellbore(s) 1 that are situated within the geologic repository 4. In some embodiments, step 507 may be a step of loading and sequestering waste-capsules 3 (with HLW) within lateral wellbore(s) 1 that are situated within the geologic repository 4. In some embodiments, step 507 may be carried out by the nuclear waste disposal companies (and/or the nuclear power generating utility 5). In some embodiments, step 521 must be completed prior to carrying out step 507. In some embodiments, steps 521 and 523 must be completed prior to carrying out step 507. In some embodiments, step 507 may progress into step 509.

Continuing discussing FIG. 5, in some embodiments, step 521 may be a step of designing, licensing, and/or implementing lateral wellbore(s) 1 within the geologic repository 4. In some embodiments, at step 521, the nuclear waste disposal companies (and/or the nuclear power generating utility 5) may locate, design, drill, and construct the geologic repository 4, with wellbores 1 and 2, that shall contain the HLW byproducts. Today, major oil well services companies like Halliburton™, Schlumberger™ and BakerHughes-GE™ are among the best available technological companies that are capable of supervising and directing the drilling and completing the needed types of vertical wellbore(s) 2 and lateral wellbore(s) 1 into the deep geological formation(s) 4 as shown in FIG. 2A, FIG. 2B, and FIG. 3. These companies have the demonstrated expertise as established by their abilities to drill and complete wellbores all over the globe, that have total vertical and lateral measured depths in excess of 40,000 feet. In some embodiments, in this step 521, the nuclear waste disposal companies (and/or the nuclear power generating utility 5) may implement the necessary processes to sequester the HLW in deep geologic formations 4 (within lateral wellbore(s) 1) according to the governmental regulations and/or laws. There exists today (circa 2019) several patents and associated technologies covering the design and drilling of the wellbores 1 and 2 necessary for the implementation of the HLW disposal in deep geologic repositories. The following U.S. utility patents and U.S. utility patent applications: U.S. Pat. Nos. 5,850,614, 5,863,283, 6,238,138, 8,933,289, 10,002,683, 10,115,490, 10,427,191, U.S. utility patent application Ser. No. 15/936,245, U.S. utility patent application Ser. No. 16/709,701, and U.S. utility patent application Ser. No. 16/191,390, illustrate embodiments that implement wellbore drilling systems and methods for deep geologic disposal of high waste. The immediately identified above U.S. utility patents and U.S. utility patent applications are incorporated by reference herein. In some embodiments, step 521 may progress into step 523.

Continuing discussing FIG. 5, in some embodiments, step 523 may be a step of step of licensing the given geologic repository 4. In some embodiments, at step 523, the nuclear generator companies 5 or their associated companies (and/or the nuclear waste disposal companies) may obtain a license of the geologic repository 4 before or after the geologic repository is drilled with wellbores 1 and 2, but before the HLW is transferred to the wellhead site of that geologic repository 4. Such a license for the repository 4 may be a contract (or the like legal instrument), delivered after major internal and external review and negotiations, between the utility 5 and the Nuclear Regulatory Commission (NRC) (or its successor in interest or the like) that grants the utility 5 the right to develop and utilize the geological repository 4 for HLW disposal. In some embodiments, step 523 may progress into step 507. If an embodiment where step 523 may be omitted, then step 521 may progress into step 507.

In some embodiments, prior to the step 507, the method 500 may further comprise the step 523 of receiving approval to use the deep geologic repository 4 formed in the step 521, as a repository 4 for at least some of the HLW, wherein the approval is from a governmental agency (e.g., NRC) with jurisdiction over the deep geologic repository 4. In some embodiments, the governmental agency (e.g., NRC) may have jurisdiction over a deep geologic repository process and/or over a location(s) of where a given deep geologic repository 4 may be located. In some embodiments, the governmental agency may have jurisdiction over the deep geologic repository 4.

Continuing discussing FIG. 5, in some embodiments, step 519 may be a step of filling the geologic repository 4 with HLW material (to capacity). In some embodiments, at step 519, the contracted (or owned) nuclear waste disposal companies (and/or the nuclear power generating utility 5) may load and sequester the HLW in waste-capsules 3 (or in other predetermined forms), into the lateral wellbores 1 of the deep geologic repository 4 and continue such loading operations until the fill capacity of the repository 4 (and/or a given lateral wellbore 1) may be reached. Thus, in some embodiments, step 519 may just be an extension or completion of step 507. In some embodiments, completion of step 519 may permit step 507 to progress into step 509.

Continuing discussing FIG. 5, in some embodiments, step 509 may be a step of transferring title and/or ownership of the HLW to the Government (e.g., the U.S. federal government). In some embodiments, in step 509, the nuclear power generator company 5 or its associates (and/or the nuclear waste disposal companies, if they have an ownership interest in the HLW) may transfer title and/or ownership of the HLW to a government agency, at this time or at any mutually agreed upon time. In some embodiments, the HLW that title/ownership is being transferred in step 509, may be HLW now stored (disposed of) within lateral wellbore(s) 1 of the given geologic repository 4. In some embodiments, step 509 may progress into step 511.

In some embodiments, where step 509 may be omitted, step 507 may progress into step 511.

Continuing discussing FIG. 5, in some embodiments, step 511 may be a step of the Government (e.g., the U.S. federal government) paying the nuclear power generator company 5. In some embodiments, the Government pays the nuclear power generator company 5 for developing and disposing of the HLW in the geologic repository 4 (per the above noted steps). In some embodiments, at least a portion of the money (funds) that the Government may pay out in step 511 may be obtained from step 406; i.e., from funds collected by the nuclear power generator company 5, that the nuclear power generator company 5 collects from its customers because the nuclear power generator company 5 is generating electric power from nuclear fuel (step 401) and generating HLW as a byproduct (step 402). In some embodiments, step 511 may progress into steps: 513, 515, and/or 517.

Continuing discussing FIG. 5, in some embodiments, step 513 may be a step of closing (and/or sealing) the geologic repository 4 (with the HLW). In some embodiments, closing a given geologic repository 4, that may contain HLW, may be closing off that geologic repository 4 from further use as a HLW repository. In some embodiments, such closing may be carried by the Government (or its agent(s), the nuclear power generator company 5, the nuclear waste disposal companies, combinations thereof, and/or the like. In some embodiments, physically sealing a given geologic repository 4, that may contain HLW, may involve filling wellbore(s) 1 and/or 2 with fillers, cements, backfills, plugs, combinations thereof, and/or the like. In some embodiments, such physical sealing may be carried by the Government (or its agent(s), the nuclear power generator company 5, the nuclear waste disposal companies, combinations thereof, and/or the like. In some embodiments, the Government may contract with the nuclear power generator company 5 and/or at least one of the nuclear waste disposal companies for closing and/or sealing steps.

Continuing discussing FIG. 5, in some embodiments, step 515 may be a step of maintaining, monitoring, and/or securing (e.g., physical onsite security) the given geologic repository 4 with the HLW. In some embodiments, the Government (e.g., the U.S. federal government) may have overall oversight and/or responsibility of the given geologic repository 4 with the HLW. In some embodiments, step 515 may be configured to find internal threats (e.g., structural containment problems [e.g., from natural disaster]) and/or to find external threats (e.g., terrorist threat and/or attack) to the given geologic repository 4 with the HLW. In some embodiments, such maintaining, monitoring, and/or securing may be carried by the Government (or its agent(s)), the nuclear power generator company 5, the nuclear waste disposal companies, combinations thereof, and/or the like. In some embodiments, the Government may contract with the nuclear power generator company 5 and/or at least one of the nuclear waste disposal companies for the maintaining, monitoring, and/or securing step 515. In some embodiments, step 515 may progress into step 517.

Continuing discussing FIG. 5, in some embodiments, step 517 may be a step of using the given geologic repository 4 (with HLW) as a temporary or as a permanent HLW disposal facility. In some embodiments, in step 517, the Government (e.g., the U.S. federal government) specifies that the geologic repository 4 (with HLW) is either a temporary or permanent repository for/of HLW disposal.

In some embodiments, method 500 may be a method for managing disposal of high-level nuclear waste (HLW). In some embodiments, method 500 may comprise at least some steps of: step 401 of generating electrical power from nuclear fuel; step 402 of generating the HLW as a byproduct of the step 401; step 503 of encapsulating predetermined amounts of the HLW within waste-capsules 3; step 521 of forming a deep geologic repository 4, wherein the deep geologic repository 4 may comprises at least one lateral wellbore 1 within a deep geologic rock formation 4, wherein the at least one lateral wellbore 1 is configured to receive the waste-capsules 3 (with the HLW), wherein the deep geologic rock formation 4 may be located at least 5,000 feet below a surface of the Earth; and step 507 of loading the waste-capsules 3, with the predetermined amounts of the HLW, within the at least one lateral wellbore 1. In some embodiments, step 401 and step 402 may be carried out by at least one nuclear generating power utility company 5. See e.g., FIG. 5.

In some embodiments, the at least one nuclear generating power utility company 5 may contract with at least one nuclear waste disposal company; wherein the at least one nuclear waste disposal company may be contracted to handle and carryout at least one of: step 503, step 521, step 507, step 509, step 404, step 405, combinations thereof, and/or the like. See e.g., FIG. 5.

In some embodiments, the at least one nuclear generating power utility company 5 may retain oversight over at least one of: step 503, step 521, step 507, step 509, step 404, and/or step 405. Such oversight retention may permit the at least one nuclear generating power utility company 5 to make sure regulatory compliance is achieved. Such oversight retention may permit the at least one nuclear generating power utility company 5 to: terminate/fire the at least one nuclear waste disposal company; hire another nuclear waste disposal company; modify contract(s) with nuclear waste disposal companies; cancel/terminate contract(s) with nuclear waste disposal companies, combinations thereof, and/or the like. See e.g., FIG. 5.

In some embodiments, prior to the step 503, the method 500 may further comprise step 404 and/or step 405, of storing at least some of the HLW at or near the surface of the Earth. In some embodiments, step 404 and/or step 405 may occur in pools, ponds, casks, combinations thereof, and/or the like. See e.g., FIG. 5.

In some embodiments, prior to the step 507, the method 500 may further comprise step 505 of transporting at least some of the waste-capsules 3 (with HLW) to a site with at least one vertical wellbore 2 that is physically linked to the at least one lateral wellbore 1. See e.g., FIG. 5.

In some embodiments, wherein prior to step 507, the method 500 may further comprise step 523 of receiving approval to use the deep geologic repository 4 formed in step 521, as a repository 4 for at least some of the HLW, wherein the approval is from a governmental agency (e.g., the NRC) with jurisdiction over the deep geologic repository 4. In some embodiments, the governmental agency (e.g., the NRC) may have jurisdiction over a deep geologic repository process and/or over a location(s) of where a given deep geologic repository 4 may be located. In some embodiments, the governmental agency may have jurisdiction over the deep geologic repository 4. In some embodiments, at least one nuclear generating power utility company 5 may receives the approval to use the deep geologic repository 4 as the repository 4 for the at least some of the HLW. See e.g., FIG. 5.

In some embodiments, after step 507, method 500 may further comprise step 509 of transferring ownership of the HLW within the at least one lateral wellbore 1 of the deep geologic repository 4. In some embodiments, a government (e.g., the U.S. federal government) may receive the ownership of the HLW within the at least one lateral wellbore 1. See e.g., FIG. 5.

In some embodiments, after step 507, method 500 may further comprise step 511 of receiving at least one payment as compensation for at least one of: step 503, step 521, step 507, step 509, step 404, step 405, combinations thereof, and/or the like. In some embodiments, the at least one payment may be received from a government (e.g., the U.S. federal government). In some embodiments, the at least one payment is received with the at least one nuclear generating power utility company 5. See e.g., FIG. 5.

In some embodiments, after step 507, method 500 may further comprise step 513 of closing the deep geologic repository 4. See e.g., FIG. 5.

In some embodiments, after step 507, method 500 may further comprise step 515 of maintaining, monitoring, and providing onsite physical security with respect to the deep geologic repository 4. See e.g., FIG. 5.

In some embodiments, after step 507, method 500 may further comprise step 517 of using the deep geologic repository 4 as either temporary disposal or permanent disposal of the HLW located within that deep geologic repository 4. See e.g., FIG. 5.

Method(s) of managing disposal of HLW (high-level nuclear waste) have been described. The foregoing description of the various exemplary embodiments of the invention has been presented for the purposes of illustration and disclosure. It is not intended to be exhaustive or to limit the invention to the precise form disclosed. Many modifications and variations are possible in light of the above teaching without departing from the spirit of the invention.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A method for managing disposal of high-level nuclear waste, the method comprising steps of:
    (a) generating electrical power from nuclear fuel;
    (b) generating the high-level nuclear waste as a byproduct of the step (a);
    (c) encapsulating predetermined amounts of the high-level nuclear waste within waste-capsules;

(d) forming a deep geologic repository, wherein the deep geologic repository comprises at least one lateral wellbore within a deep geologic rock formation, wherein the at least one lateral wellbore is configured to receive the waste-capsules, wherein the deep geologic rock formation is located at least 5,000 feet below a surface of the Earth; and (e) loading the waste-capsules, with the predetermined amounts of the high-level nuclear waste, within the at least one lateral wellbore.

2. The method according to claim 1, wherein the step (a) and the step (b) are carried out by at least one nuclear generating power utility company.

3. The method according to claim 2, wherein the at least one nuclear generating power utility company contracts with at least one nuclear waste disposal company; wherein the at least one nuclear waste disposal company is contracted to handle and carryout at least one of: the step (c), the step (d), or the step (e).

4. The method according to claim 3, wherein the at least one nuclear generating power utility company retains oversight over the step (c), the step, (d), or the step (e).

5. The method according to claim 1, wherein prior to the step (c), the method further comprises a step (f) of storing at least some of the high-level nuclear waste at or near the surface of the Earth.

6. The method according to claim 5, wherein the step (f) occurs in pools, ponds, casks, or combinations thereof.

7. The method according to claim 5, wherein the step (a) and the step (b) are carried by at least one nuclear generating power utility company; wherein the at least one nuclear generating power utility company contracts with at least one nuclear waste disposal company; wherein the at least one nuclear waste disposal company is contracted to handle and carryout the step (f).

8. The method according to claim 1, wherein prior to the step (e), the method further comprises a step of transporting at least some of the waste-capsules to a site with at least one vertical wellbore that is physically linked to the at least one lateral wellbore.

9. The method according to claim 8, wherein the step (a) and the step (b) are carried by at least one nuclear generating power utility company; wherein the at least one nuclear generating power utility company contracts with at least one nuclear waste disposal company; wherein the at least one nuclear waste disposal company is contracted to handle and carryout the transporting step.

10. The method according to claim 1, wherein prior to the step (e), the method further comprises a step of receiving approval to use the deep geologic repository formed in the step (d), as a repository for at least some of the high-level nuclear waste, wherein the approval is from a governmental agency with jurisdiction over the deep geologic repository.

11. The method according to claim 10, wherein at least one nuclear generating power utility company receives the approval to use the deep geologic repository as the repository for the at least some of the high-level nuclear waste.

12. The method according to claim 1, wherein after the step (e), the method further comprises a step of transferring ownership of the high-level nuclear waste within the at least one lateral wellbore of the deep geologic repository.

13. The method according to claim 12, wherein a government receives the ownership of the high-level nuclear waste within the at least one lateral wellbore.

14. The method according to claim 1, wherein after the step (e), the method further comprises a step of receiving at least one payment as compensation for at least one of: the step (c), the step (d), or the step (e).

15. The method according to claim 14, wherein the at least one payment is received from a government.

16. The method according to claim 14, wherein the at least one payment is received with at least one nuclear generating power utility company.

17. The method according to claim 1, wherein after the step (e), the method further comprises a step of closing the deep geologic repository.

18. The method according to claim 1, wherein after the step (e), the method further comprises a step of maintaining, monitoring, and providing onsite physical security with respect to the deep geologic repository.

19. The method according to claim 1, wherein after the step (e), the method further comprises a step of using the deep geologic repository as either temporary disposal or permanent disposal of the high-level nuclear waste located within that deep geologic repository.

* * * * *